(12) United States Patent
Letz et al.

(10) Patent No.: US 9,178,867 B1
(45) Date of Patent: Nov. 3, 2015

(54) INTERACTING WITH RESTRICTED ENVIRONMENTS

(71) Applicant: Amazon Technologies, Inc., Reno, NV (US)

(72) Inventors: Stefan Letz, Cape Town (ZA); Ross Bevan Engers, Cape Town (ZA); Daniel Bauman, Cape Town (ZA); Willem Jacob Buys, Cape Town (ZA); Timothy Ralph Sjoberg, Cape Town (ZA); Ronen Dov Agranat, Cape Town (ZA); Aidan Musnitzky, Cape Town (ZA); Joshua Mentz, Cape Town (ZA); Brian Frederick Mulder, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 58 days.

(21) Appl. No.: 14/219,827

(22) Filed: Mar. 19, 2014

(51) Int. Cl.
*H04L 12/00* (2006.01)
*H04L 29/06* (2006.01)

(52) U.S. Cl.
CPC .................................. *H04L 63/0807* (2013.01)

(58) Field of Classification Search
CPC .................................. H04L 63/20; H04L 63/08
See application file for complete search history.

(56) References Cited

U.S. PATENT DOCUMENTS

| | | | |
|---|---|---|---|
| 8,825,011 B2 * | 9/2014 | Salkini et al. .................. | 455/411 |
| 2012/0221861 A1 * | 8/2012 | Boldyrev et al. .............. | 713/176 |
| 2015/0074743 A1 * | 3/2015 | Ilieva et al. ..................... | 726/1 |

OTHER PUBLICATIONS

"ARM Synchronization Primitives"—ARM, Oct. 2009 http://infocenter.arm.com/help/topic/com.arm.doc.dht0008a/DHT0008A_arm_synchronization_primitives.pdf.*

* cited by examiner

*Primary Examiner* — Randy Scott
(74) *Attorney, Agent, or Firm* — Hogan Lovells US LLP

(57) ABSTRACT

A computer-implemented method includes recording one or more actions being performed by an agent using at least one resource of a resource provider environment, the at least one resource being associated with a non-restricted zone in the resource provider environment. The method includes creating a primitive that describes the one or more actions. The primitive is able to be executed on at least one different resource in a restricted zone in the resource provider environment to perform the one or more actions using the different resource. The restricted zone includes resources associated with a customer that are directly accessible only to at least one authorized entity. The method includes submitting the primitive to the restricted zone in the resource provider environment. The primitive is able to be executed by the at least one authorized entity on the at least one different resource in the restricted zone.

20 Claims, 8 Drawing Sheets

INTERACTING WITH RESTRICTED ENVIRONMENTS

BACKGROUND

As an increasing number of applications and services are being made available over networks, such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

It might be the case, however, that a customer will have applications that relate to, or utilize, restricted data, such that the customer will want to be able to execute operational actions to the restricted data, or have the resource provider execute operational actions on the customer's behalf, while still abiding by legal or organizational constraints that regulate which entities have the authority to access the restricted data and to execute the operational actions. Conventional cloud management approaches thus cannot be utilized as the persons, resources, and applications typically responsible for managing the resources in a resource provider environment will not have direct access to any of the resources in that restricted zone. The people inside the restricted zone also typically will not have the knowledge and/or information needed to properly operate and update the resources of the provider from within the restricted zone.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of resources in an electronic environment. In particular, various embodiments enable the management of resources to which access is at least partially restricted. As mentioned above, a resource provider might provide a set of resources of one or more types that are able to be utilized by multiple clients, such as may be part of a multi-tenant, shared resource, or "cloud" offering. There might be client data stored on, or processed by, at least some of those resources to which the provider is not to have access. Conventional approaches would prevent the successful management of resources in such a restricted zone (real or virtual), as some of the information needed for management would not be available outside of the restricted zone.

Approaches in accordance with various embodiments provide the ability to interact with resources in a restricted zone by using, for example, a process for generating a primitive, e.g., a macro, that includes one or more operational actions. The primitive may be generated by, for example, a customer that is interacting with resources in a non-restricted zone. The resources in the non-restricted zone may be configured to simulate an environment that is similar to the resources in the restricted zone. The generated primitive can be sent to an authorized entity that has access to resources in in the restricted zone for approval and execution. The authorized entity can be, for example, an entity of the resource provider that has been authorized by the customer of the restricted zone. For example, data describing the generated primitive can be sent to the restricted zone as a link to a file, e.g., JavaScript Object Notation (JSON) file. Once received at the restricted zone, the generated primitive can be replayed on the restricted resources.

Once a primitive is approved, the approved primitive can optionally be stored both in the restricted zone and outside the restricted zone in the provider environment. Subsequent submissions of that primitive then can be executed by authorized entities without review in the restricted area. Such approaches can provide a structured and centralized place for the storing and sharing of operational knowledge. Such approaches can also help to reduce the likelihood of human error, provide faster results and feedback, and simplify the overall the management process by reducing the amount of knowledge and number of tasks needed for operators of resources in a restricted zone.

Various other applications, processes and uses are presented below with respect to the various embodiments.

Figure 1:
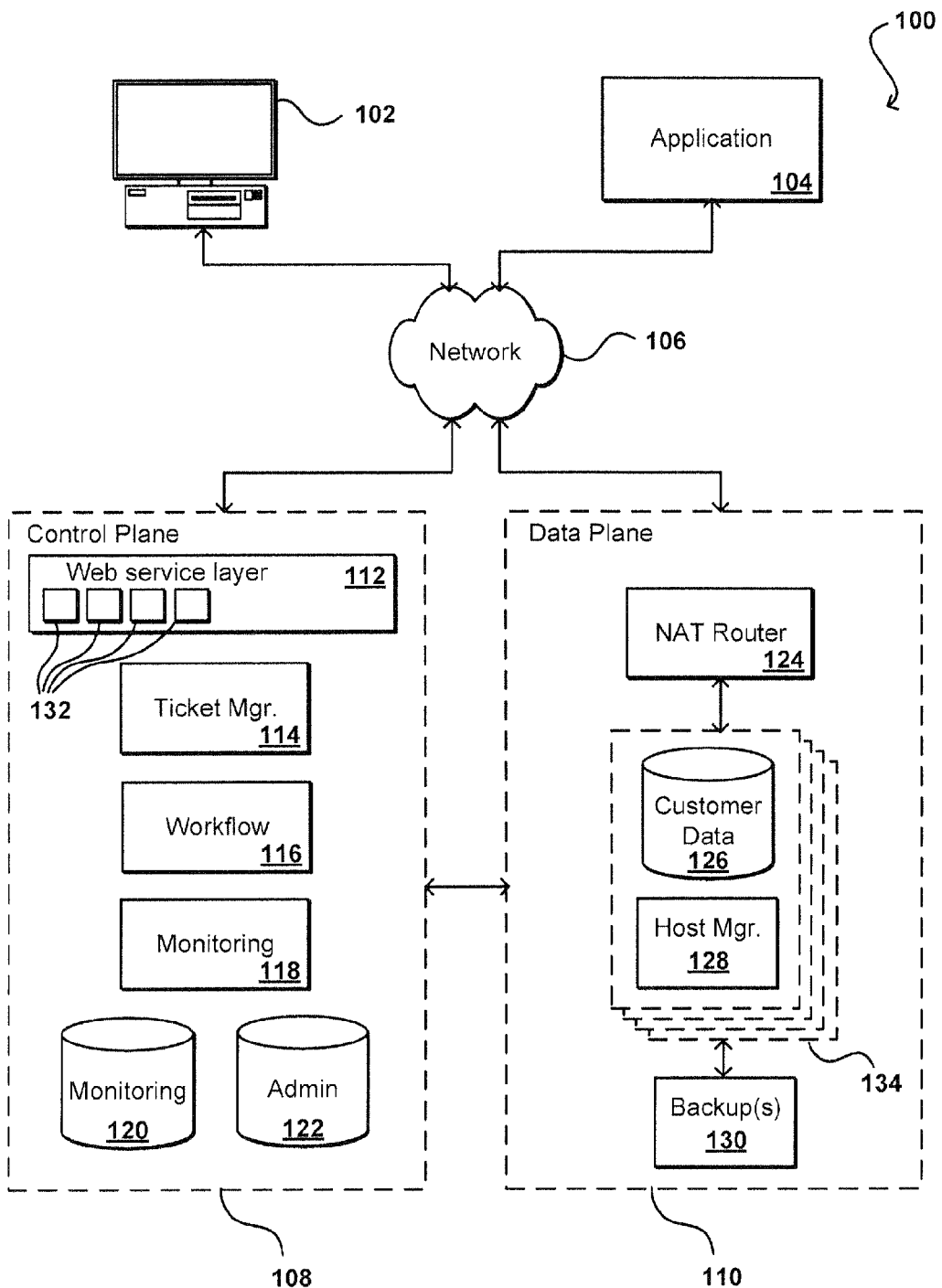
FIG. 1 illustrates an environment in which various embodiments can be implemented.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, relational databases, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task, e.g., to update software on a server of the data plane 110. The user or an application 104 in many instances can access the resource for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 108 in this example is essentially a virtual layer of hardware and software components that handles control and management actions, e.g., provisioning, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web service calls or requests through the network 106. Each API can be provided to receive requests for at least one specific action to be performed with respect to the data environment, e.g., to provision, scale, clone, or hibernate an instance of a relational database. Upon receiving a request to one of the APIs, the Web services layer can parse or otherwise analyze the request to determine the steps or actions that are needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features, e.g., authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "ticket manager" component 114. A ticket manager component can be any appropriate component operable to determine any tasks to be executed in response to an outstanding request. In this example, the Web services layer might place instructions or information for a request in a job queue, and the ticket manager can identify the outstanding request and determine any tasks corresponding to the request. Various other approaches can be used as would be apparent to one of ordinary skill in the art, such as the Web services layer sending a notification to a ticket manager that a job exists. The ticket manager component can identify the request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks, including, for example: repository creation, modification, and deletion; recovery and backup; security group creation, deletion, and modification; user credentials management; and key rotation and credential management. Such workflows can be implemented on top of a workflow service, as discussed elsewhere herein.

An example workflow for a customer might include tasks, e.g., provisioning a data store instance, allocating a volume of off-instance persistent storage, attaching the persistent storage volume to the data store instance, then allocating and attaching a Domain Name Service (DNS) address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, e.g., deleting, creating, or modifying one of more data store instances, such as to increase storage. In some embodiments, the workflow information is written to storage, and at least one separate execution component pulls, or otherwise accesses or receives, tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task, a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service. The reply can provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When a data instance is created in the data plane, information for the instance can be written to a data store in the control plane, e.g., a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, e.g., collecting log and/or event information from multiple components of the control plane and/or data plane, e.g., the Web service layer, workflow component, ticket manager component, and various host managers. Using such event information, the monitoring component can expose customer-visible events, for various purposes, including, for example, implementing customer-facing APIs. A monitoring component can constantly monitor the health of all the running repositories and/or instances for the control plane, detect the failure of any of these instances, and initiate the appropriate recovery process(es).

Each instance 134 in the data plane can include at least one data store 126 and a host manager component 128 for the machine providing access to the data store. A host manager in one embodiment is an application or software agent executing on an instance and/or application server, e.g., a Tomcat or Java application server, programmed to manage tasks, e.g., software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades for the data store and/or operating system. A host manger also can collect relevant metrics, such as may relate to CPU, memory, and I/O usage.

The monitoring component can communicate periodically with each host manager 128 for monitored instances 134, e.g., by sending a specific request or by monitoring heartbeats from the host managers, to determine a status of each host. In one embodiment, the monitoring component includes a set of event processors (or monitoring servers) configured to issue commands to each host manager, e.g., to get the status of a particular host and/or instance. If a response is not received after a specified number of retries, then the monitoring component can determine that there is a problem and can store information in the Admin data store 122 or another such job queue to perform an action for the instance, e.g., to verify the problem and re-provision the instance, if necessary. The ticket manager can access this information and kick off a recovery workflow for the instance to attempt to automatically recover from the failure. The host manager 128 can act as a proxy for the monitoring and other components of the control plane, performing tasks for the instances on behalf of the control plane components. Occasionally, a problem will occur with one of the instances, e.g., the corresponding host, instance, or volume crashing, rebooting, restarting, etc., which cannot be solved automatically. In one embodiment, a logging component can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although, in some embodiments, this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 110 to directly interact with that instance 134. In one embodiment the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, and can have at least one backup instance or copy in persistent storage 130. Using such an approach, once the instance has been configured through the control plane, a user, application, service, or component can interact with the instance directly through requests to the data plane, without having to access the control plane 132. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

As discussed, however, it is possible that a customer will want to utilize a set of resources or services provided through the resource provider environment, but is unwilling or unable to grant access to the data to be stored and/or processed by those resources or services. Further, in some cases the customer might not want anyone outside the customer's control to have any direct access to the resources at all. For example, an airport might use server capacity and data capacity for flight control or a municipality might use such resources for voting, ballot, or election purposes. There might be legal restrictions on access, in addition to any preferences or policies of the customer. Using conventional approaches, the ability of such a customer to utilize a resource provider environment would be limited at best.

Figure 2:
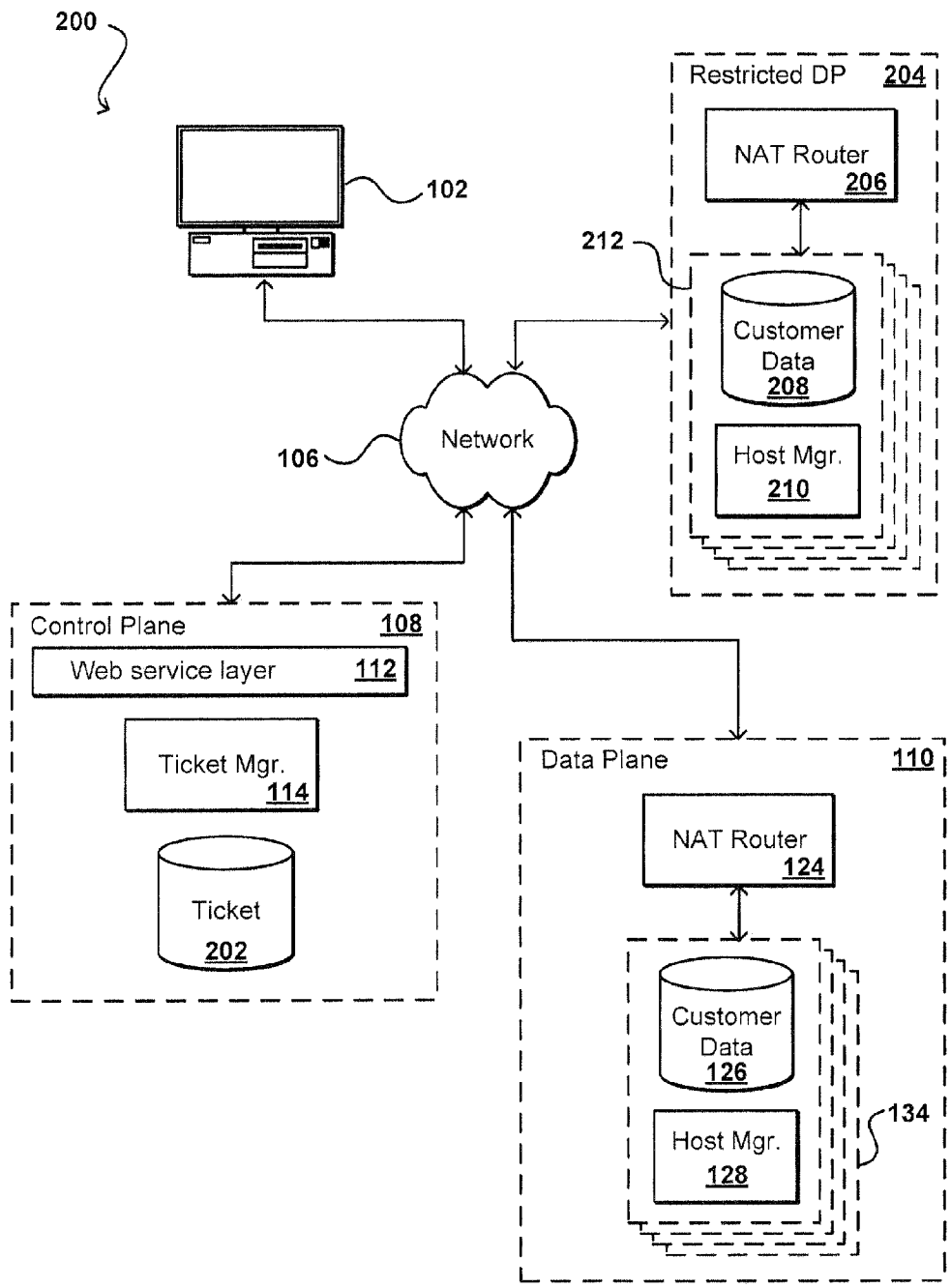
FIG. 2 illustrates an example situation in which various resources of the data plane are located in a restricted zone in accordance with various embodiments.

One way to provide resources to such a customer is to segment, physically or virtually, the data plane into the general provider environment and one or more restricted zones 204, as illustrated in the example of FIG. 2. In some embodiments, each of the one or more restricted zones 204 is accessible by authorized entities through a respective restricted control plane for that restricted zone. For example, entities that are authorized to access a particular restricted zone can interact with a restricted control plane that corresponds to the particular restricted zone. The restricted control plane can provide some or all of the features described with respect to the control plane 108 for the particular restricted zone. For example, the restricted control plane can include, for the particular restricted zone, a corresponding a web service layer, a ticket manager, and a ticket repository. Further, authorized entities can interact with the restricted control plane in a manner similar to the control plane 108.

In a physical segmentation a specific set of resources (e.g., a NAT router 206 and servers or server instances 212, each associated with a host manager 210 and potentially data storage 208) in a designated physical location can be allocated to a particular customer, with only people having appropriate credentials from the customer having access to those resources. In a virtual segmentation, the resources of the restricted region 204 can be intermixed with the resources of the general data plane 110, except that access to a subset of those resources will be restricted to credentials of the customer when the resources of that subset are allocated to the customer as part of the restricted zone. A potential benefit to the virtual segmentation is that additional resources can be added, or resources changed or removed, as needed to provide better resource utilization. In some situations, however, the customer may not allow such usage for fear that information from one of those resources will be recoverable by a different customer subsequently provisioned on one of those resources, etc.

The assigning of a subset of resources to a restricted zone 204, however, does not solve the issue of how to interact with those resources without being able to directly access those resources or extract the necessary data from within the restricted zone 204. While the resource provider might keep a redundant set of data in the general data plane 110 to have an idea of what exists in the restricted data plane 204, the provider will still be limited in the accuracy of the redundant set.

Approaches in accordance with various embodiments can permit interaction with resources in such a restricted zone 204. For example, the restricted zone 204 can be configured so that only approved authorized entities are able to access and manage resources in the restricted zone 204. Examples of resources that are able to be managed include, for example, server hardware, operating systems on hosts, networking, and credentials. These authorized entities can act as a proxy for service owners, e.g., customers, for operating and managing resources in the restricted zone 204. The service owners themselves do not typically have direct access to their resources that are in the restricted zone 204. Instead, in some embodiments, the service owners provide, to the authorized entities, recorded instructions, e.g., primitives, that include one or more operational actions to be replayed, e.g., executed, on resources in the restricted zone 204. Such an infrastructure can help fulfill certain data security and legal requirements by restricting access to resources in the restricted zone 204 to only the authorized entities while still allowing service owners to indirectly interact with the restricted resources.

A "primitive" as used herein refers to an operational action that can be performed with respect to a resource. The primitive can be submitted to the restricted zone 204 using the techniques described in this specification. Primitives can also be combined into more complex workflows that can be submitted to the restricted zone 204. Copies of the primitives and/or workflows can also be stored in the control plane 108 or general data plane 110, among other appropriate locations. The primitives provide a way to pass information to the restricted zone 204 for management of the resources in the restricted zone 204.

For example, a service owner can create a primitive that specifies operational actions for installing software on resources in the restricted zone 204. The primitive can be created by the service owner while interacting with resources that are available in a non-restricted zone, e.g., the data plane 110, that can serve as a test or pre-production region. One example primitive can involve performing the operational actions of 1) connecting to the console of a server, 2) logging into the console of the server, 3) installing software on the operating system, 4) generating a result indicating whether the software installation was successful, and 5) providing, to the service owner, a result indicating whether the software installation was successful. In some embodiments, one or more customizable parameters that correspond to a primitive can also be specified at the time of creating the primitive. Subsequently, for example, when a ticket that references the primitive is being generated, an entity can provide values for the one or more specified parameters to be used when executing the primitive. For example, if the primitive specifies operational actions for installing software, then the service owner can specify one or more parameters for customizing which version of the software to install, packages to be installed with the software, access permissions, an installation directory path, etc.

To generate the primitive, the service owner can interact with the resources in the non-restricted zone 204 through an interface, e.g., a graphical user interface (GUI) or a command line interface, and perform operational actions to be recorded and replayed on the resources in the restricted zone 204.

In some embodiments, the service owner can interact with a GUI to manage resources by selecting options that include, for example, restarting or rebooting an instance, modifying a resource configuration, installing software, etc. In such embodiments, the GUI can be configured to include an option, e.g., "record primitive," for generating a primitive. Once the option is selected, the service owner can interact with the GUI to perform a sequence of one or more operational actions. Each operational action performed by the service owner, together with the sequence in which it was performed, is recorded including, for example, commands performed, options selected, attributes used when performing the commands, etc. When the service owner is ready to generate the primitive, the service owner can again select the option to stop recording. Upon selecting the option, a computing device, e.g., the computing device on which the GUI is being presented, can generate the primitive that includes the sequence of operational actions that were performed by the service owner. When this primitive is replayed, for example, in the restricted zone 204, the replay will result in the sequence of operational actions being performed on the specified resources that are in the restricted zone 204.

In some embodiments, the GUI includes a first region and a second region. The first region includes the option, e.g., "record primitive," for generating the primitive. The service owner can interact with the first interface to perform and record the one or more operational actions to be included in the primitive, as described above. The second region can include an editor, e.g., a text editor, for making edits to the primitive that is being recorded. Additionally, the editor can be used to define various parameters for the primitive, as described in this specification. For example, the service owner can interact with the second interface to edit the primitive to remove certain operational actions or elements that do not need to be included in the primitive. The service owner can also interact with the second region to include test operational actions that include logical tests, pre-conditions, and/or post-conditions. In other words, the first region can be used to record a series of operations that are to be recorded and saved as a primitive while the second interface can be used to visualize the operations being recorded, for example, in a human-readable format.

When generating the primitive, the service owner can also identify resources, e.g., an instance of a particular server or database, to which the primitive is to be replayed on. This identification can be used, for example, by authorized entities when replaying the primitive in the restricted zone 204. The service owner can also include, in the primitive, test operational actions that include logical tests, pre-conditions, and/or post-conditions. For example, a primitive that includes operational actions for installing a software package A1 and a software package B1 can also include pre-conditions that specify that software package A1 should be installed only if a third software package is already installed and that software package B1 should be installed only if the installation of software package A1 was successful. Similarly, a post-condition can be included in the primitive to test the restricted zone environment after the primitive has been executed to confirm that certain conditions have been satisfied. In some embodiments, the output that is produced as a result of replaying a primitive in the restricted zone 204 can be captured and provided to the service owner for review. For example, in the example above, if the installation of software package A1 failed, then this result, together with the error that was produced, can be captured and communicated to the service owner, for example, in the form of a file or message, e.g., e-mail. In another example, if the primitive specified operational actions for performing network analysis, e.g., a ping or traceroute operation, then the output that was produced as a result of replaying those operational actions, e.g., results of the ping or traceroute operation, can be provided to the service owner for evaluation.

In some embodiments, the service owner can interact with a command line interface to generate the primitive. For example, the service owner can execute a command, e.g., "record primitive" to begin recording the primitive, perform a sequence of one or more operational actions to be included in the primitive, and then execute another command, e.g., "save primitive," to stop recording the primitive. In some embodiments, the service owner can execute operational actions against an Application Programming Interface (API) and those operational actions can be recorded by the API to generate the primitive. The primitive can then be sent and replayed in the restricted zone 204.

Once created, the primitive can be sent to the restricted zone 204, for example, by generating a virtual "ticket" that can be submitted to the appropriate address or interface of the restricted zone 204. In some embodiments, the user will still interact with the control plane 108 to generate the ticket via a ticket manager 114, which can then cause the ticket to be submitted to the appropriate address of the appropriate restricted zone 204. Information for the ticket can be stored locally, such as in a ticket repository 202, which can also store information about existing primitives, among other related data.

In some embodiments, a primitive that is generated in the non-restricted zone may include certain redacted variables that are able to be populated automatically once the primitive is received in the restricted zone 204. For example, the primitive created in the non-restricted zone may use restricted data that needs to be redacted or obfuscated to satisfy security or legal requirements. For example, some legal requirements may control the types of information that can be sent from a non-restricted to a restricted zone. Similarly, some legal requirements may control the types of information that can be sent from a restricted to a non-restricted zone. Examples of restricted data can include a particular set of credentials, e.g., a username and password, or a particular host name. Thus, in some embodiments, the primitive created in the non-restricted zone may include placeholders, or symbolic variables, e.g., "$password" or "dbhost=$hostclass/hostgroups" that reference the actual values for the restricted data. Once the primitive is received in the restricted zone 204, these placeholders can be automatically resolved by looking up their corresponding values using resources accessible from the restricted zone 204.

The ticket can include a file, e.g., a JavaScript Object Notation (JSON) file that describes the operational actions associated with the primitive, or a link, e.g., hyperlink, to a file that describes the primitive. When the ticket is received to the restricted zone 204, an appropriate console or other such component can enable vetted personnel, e.g., authorized entities, to review, approve, and execute, e.g., replay, the primitive in the restricted zone 204 to perform the operational actions that are specified in the primitive on the designated resources in the restricted zone 204. For example, the vetted personnel can review the operational actions specified in the primitive to determine whether the operational actions satisfy security requirements, e.g., determine that no malicious code is being obtained or executed, or whether the operational actions satisfy legal requirements that have been specified for the restricted zone 204.

There may be additional security requirements, e.g., permissions, that need to be satisfied before vetted personnel are able to replay the primitive in the restricted zone 204. For example, the service owner's credentials in the non-restricted zone may be associated with a certain set of security permissions that permit the service owner to perform particular operational actions. Authorized entities that can potentially replay the primitive in the restricted zone 204, however, may have credentials that are associated with a different set of security permissions that permit the authorized entities to perform certain operational actions. For example, a first authorized entity may have credentials that allow the first entity to perform operational actions on an instance of a database while a second authorized entity may have credentials that permit the second entity to perform operational actions on an instance of a server. Thus, in some embodiments, a shared security model between the non-restricted zone and the restricted zone 204 is used to allow for an overlap in security permissions between the service owner that created the primitive in the non-restricted zone and the authorized entity that is tasked with replaying the primitive in the restricted zone 204. In some embodiments, authorized entities in the restricted zone 204 are included in one or more security groups. Each security group can be associated with a particular set of permissions that permit authorized entities that are associated with that security group to perform a particular set of operational actions in the restricted zone 204.

The console will also enable such a person to reject or deny any primitives associated with a ticket as well. In some embodiments, once a primitive is approved, information for the approval and the primitive can be stored in the restricted zone, such as to an approval repository as discussed later herein. Information for the approval can also be sent back to the ticket manager 114, such that the components of the control plane can have information about the current state of the resources in the restricted zone 204 and information about approved primitives can be available through the control plane, as may also be stored in the ticket repository. Thus, for example, a service owner can select a previously-approved primitive, for example, through the GUI described above, and request that the selected primitive be replayed on resources in the restricted zone 204.

Some examples of operational actions that can be included in primitives are obtaining data from the console of a server, logging into the operating system of a host and executing one or more commands, e.g., "ping", performing DNS resolution, or "traceroute", deploying, e.g., installing, firmware or software, collecting log data from hosts, modifying the configuration of a resource and/or service, e.g., a messaging service or a database, performing network analysis, and managing, e.g., creating, modifying, and propagating, credential sets, etc. The primitives, or operational actions, can take any appropriate form, e.g., an Application Programming Interface (API) command for Web services.

In some embodiments, the non-restricted zone is configured to simulate the service owner's resource configuration in the restricted zone 204. For example, if the service owner's resources in the restricted zone 204 include an instance of a particular application server and a relational database, then the non-restricted zone can be configured to also include an instance of the particular application server and the relational database. In some embodiments, resources in the non-restricted zone are configured to simulate the service owner's resource configuration in the restricted zone 204. For example, the resources in the non-restricted zone can simulate a virtual instance, e.g., by mapping a virtual machine image, of the particular application server and the relational database in the restricted zone.

In some embodiments, the configuration of the resources in the non-restricted zone is synchronized with the configuration of the resources in the restricted zone 204 to provide service owners with a test resource environment in the non-restricted zone that is a replica, or similar to, the production environment in the restricted zone 204. For example, a service owner can record a primitive in the non-restricted zone that edits an instance of a database, send the primitive to the restricted zone 204, and have an authorized entity replay the primitive on the service owner's resources in the restricted zone 204. Replaying the primitive will likely result in a change to the instance of the database in the restricted zone 204. However, in some instances, replaying the primitive may also affect other aspects of the service owner's resources in the restricted zone 204. For example, there may be ancillary changes, intentional or unintentional, that occur as a result of replaying the primitive, for example, in other resources, operating systems, software, etc. In such instances, changes that occur as a result of replaying a primitive in the restricted zone 204 can be identified and mirrored to the resources in the non-restricted zone.

Figure 3:
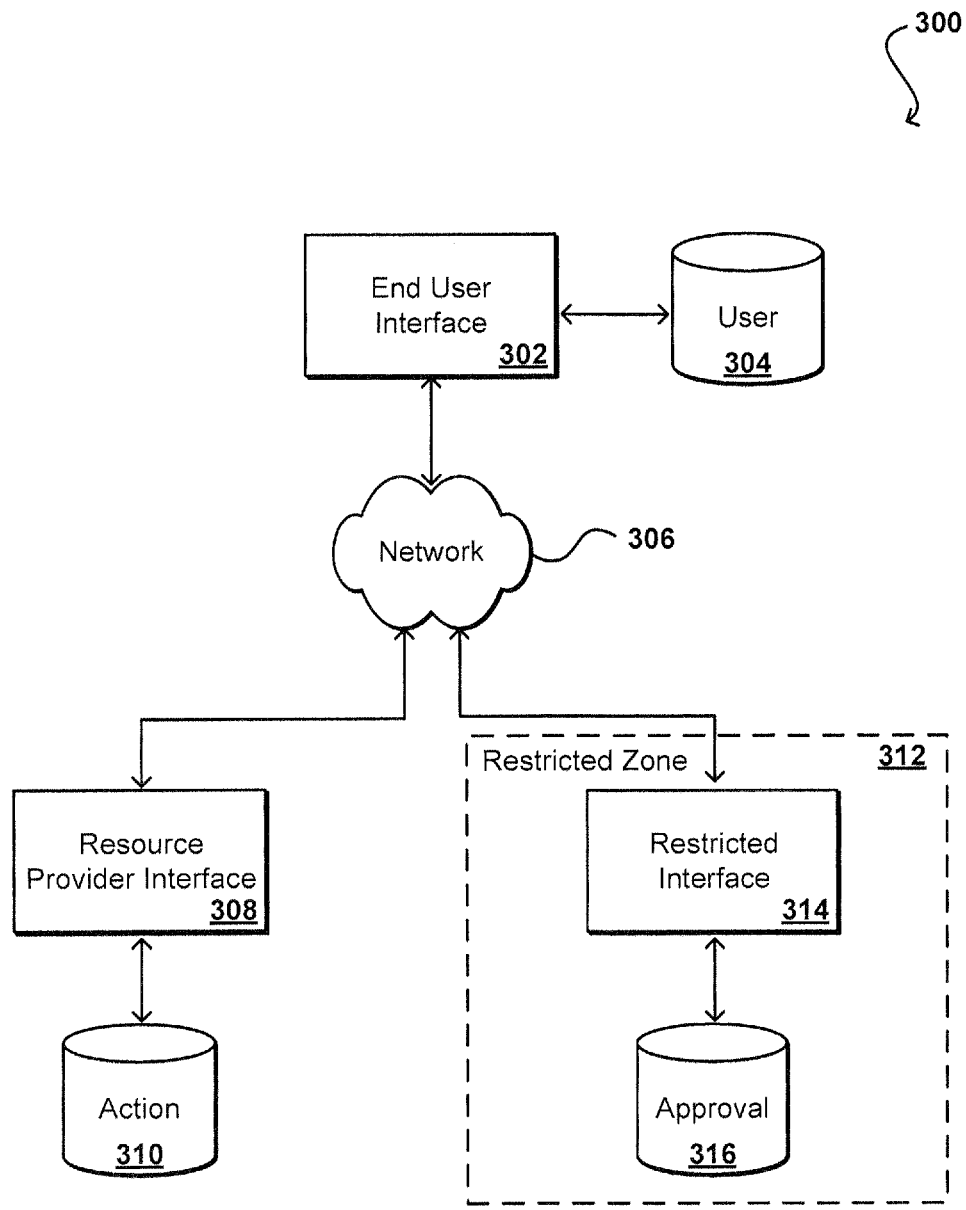
FIG. 3 illustrates an example set of components that can be used to enable primitives to be generated and submitted to a restricted zone in accordance with various embodiments.

FIG. 3 illustrates a set of example components 300 that can be utilized to implement such an approach in accordance with various embodiments. In this example, a person authorized to manage resources in the provider environment can access a resource provider interface 308, which could be part of an application or Web interface of the control plane, e.g., the control pane 110, in various embodiments. The resource provider interface 308 can enable the recording, testing, and storing of primitives or other operational actions. The interface 308 can also enable multiple primitives to be combined into one or more workflows, which can also be tested and stored through the provider interface 308. The primitives and/or workflows in at least some embodiments can be stored to an action repository 310 of the resource provider environment. The primitives and workflows in at least some embodiments are stored to the repository 310 in a hierarchical fashion.

Once a primitive is stored in the action repository 310, for example, that primitive can be exposed, or otherwise made available, across at least one network 306 to an authorized user through an end user interface 302. The end user interface 302 can enable authorized users to perform actions such as to browse, search, and select primitives and workflows to be executed. Upon one or more primitives or workflows being selected, a ticket can be generated and sent to the restricted zone 312, such as may be sent to an API of an interface layer of the restricted zone 312. In response, information about the execution of the ticket can be received and made available to the user through the end user interface 302. The information can indicate whether any or all of the primitives were executed, as well as information about any that were not executed. In some cases one or more reasons for a primitive not being executed can be provided, although the execution results can be filtered in at least some instances in order to protect or redact sensitive data prevented from leaving the restricted zone 312. A user repository 304 or other such storage device or service can store information such as the history of executed primitives and workflows along with the (potentially filtered) results.

A restricted interface 314 can be provided within the restricted (or otherwise isolated) zone 312. The restricted interface can be accessible using credentials available to people vetted and/or authorized to access data and resources within the restricted zone. The interface can enable vetted personnel to perform tasks for received tickets, such as to review, approve, deny, and execute primitives and workflows indicated by the received tickets (or otherwise identified), as well as to audit any actions taken in the restricted zone. Information about the approvals, denials, workflows, and primitives can be stored in an approval repository 316 or other storage within the restricted zone. Information about the approvals or denials can also be sent to the action repository 310 or another appropriate location available outside the restricted zone. When a primitive or workflow is subsequently received to the restricted zone 312 as part of a ticket, a check can be made to determine if an approval already exists for that primitive or workflow in the approval repository 316. If so, the primitive or workflow can be executed in the restricted environment without the need for another approval through the restricted interface 314.

A user of the restricted interface 314 can be able to filter primitives by ones that have not yet been approved. Those primitives can then be verified and, if the user has the right permissions, the user can approve the primitive to cause it to be stored as an approved primitive. If received with a ticket, the corresponding operational action(s) can also be executed in the restricted zone 312. The ticket can have been received from an appropriate external source or from within the restricted zone 312 as part of normal operations. There might be different levels of approval for different primitives, types of resources, etc. The primitives also can be utilized for execution outside the restricted zone 312 as desired.

As mentioned, persons associated with the provider environment but not vetted by the restricted zone will generally not be able to perform tasks such as logging in to host machines in the restricted zone, even though the hosts are provided as part of the resource provider offering. The inability to gain access will prevent those persons from being able to manage those resources directly, instead requiring people with access to resources in the restricted zone to manage on behalf of the provider. The tickets provide a mechanism through which people with operational knowledge of the provider environment can pass that knowledge into the restricted zone, enabling people with access to the restricted zone to actually implement and execute the appropriate management tasks. Each time a task is confirmed to have been performed in the restricted zone 312, a similar task can be performed outside the restricted zone 312 in order to have a mirrored version to use for purposes such as testing and configuration.

As mentioned, in many cases some of the information needed to execute a primitive will not be available outside the restricted zone. Accordingly, some of the primitives generated outside the restricted zone can include "placeholders" or other elements that are to be replaced with accurate information when provided to a person or resource with sufficient authority in the restricted zone. For example, a primitive might have a "region" or "hostname" placeholder, which would need to have the appropriate region or hostname data inserted in the restricted zone before being executed. Other placeholders can represent information such as names, addresses, and endpoints. Primitives can be pre-approved in at least some instances without the placeholders being filled in. It at least some embodiments, rollback commands for each primitive can also be approved for execution. Various restrictions can also be attached to the approval, such as approval for specific hosts or types of resources, etc.

There can also be various policies, authorized inside or outside the restricted zone, that can help indicate whether certain primitives should be authorized. Policies can be used to potentially whitelist or blacklist certain operational actions. The policies can address various attributes of the primitives, and can specify types of commands that can be executed against certain resources, the teams that can cause those commands to be executed, etc. Multiple parties can work together to generate a policy, such as an "outsider" with operational knowledge about the provider environment and an "insider" with knowledge about the restricted zone. For example, the outside party with the knowledge can generate general policies, and then a person inside the restricted zone can modify or add policy portions that are zone specific. In some cases each person might have to approve any policy changes made by the other, where allowed by restriction. There also can be separate policies on how to provide a primitive from outside the zone and then other policies indicating what can be executed or approved within the zone. There also can be policies on the types of data that can leave the zone, and the types of data or information (such as account or IP address information) to be stripped from the data before passing outside the zone.

Figure 4:
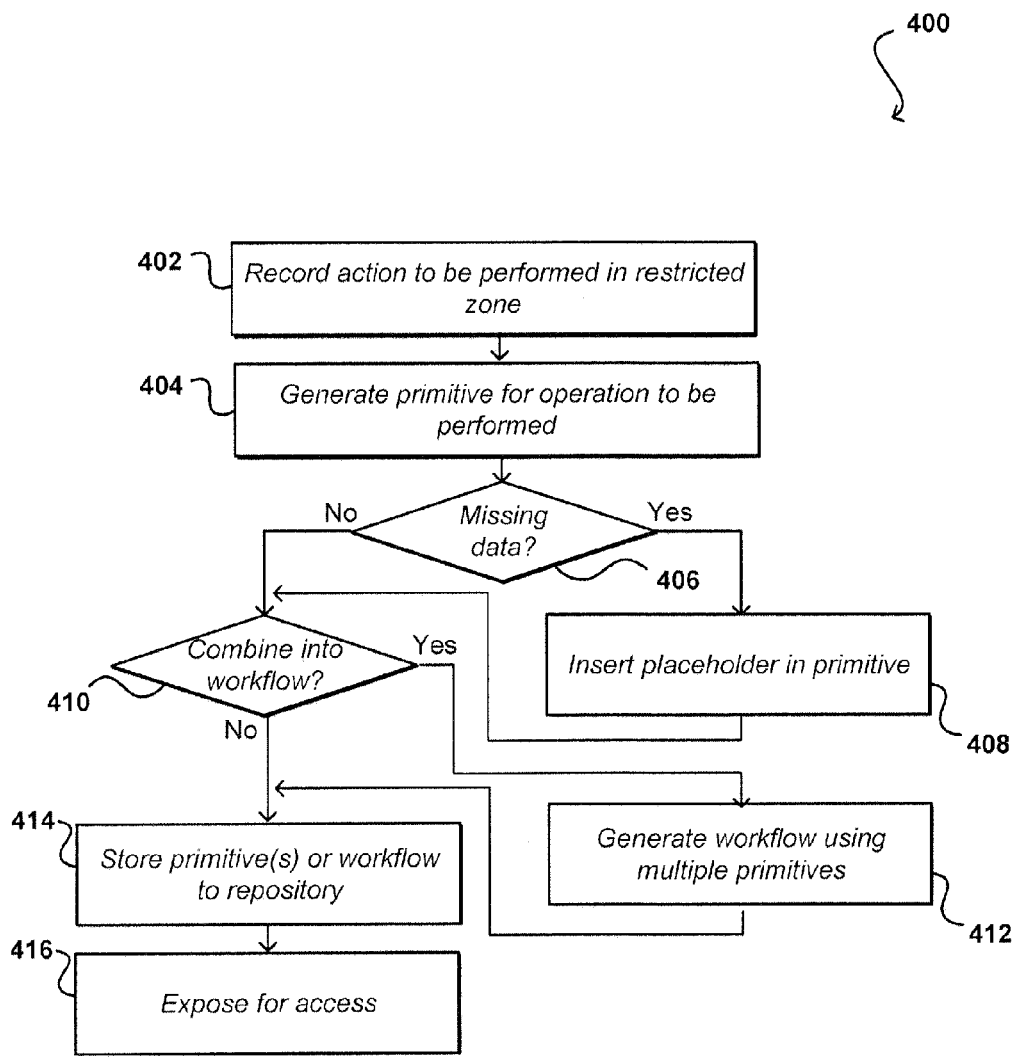
FIG. 4 illustrates an example process for generating primitives that can be used in accordance with various embodiments.

FIG. 4 illustrates an example process 400 for generating primitives and workflows that can be executed in a restricted or unrestricted zone in accordance with various embodiments. It should be understood that, for any process discussed herein, there can be additional, fewer, or alternative steps performed in similar or alternative orders, or in parallel, within the scope of the various embodiments unless otherwise stated. In this example, at least one operational action is recorded 402 that is to be executed against a resource in a restricted zone. As discussed elsewhere herein, such an operational action, which can be referred to as an operation, action, or command, can be executed on resources outside a restricted zone as well in at least some embodiments. Once at least one operational action is recorded, a primitive can be generated 404 for each operational action (or group of operational actions). The primitive can take any appropriate form, such as an API command or Web service call, among others. A determination can be made 406 as to whether a complete primitive can be generated for execution, or whether the primitive will be missing data that is unable to be sent outside the restricted zone. For example, the missing data can be a placeholder, e.g., symbol, that can be resolved, for example, manually through user input or using some automated methods, as described above. If the primitive is missing data, such as a resource name or address, a placeholder can be inserted 408 in the primitive in place of each instance of missing data. Other approaches can be used as well in accordance with various embodiments.

As discussed, in some embodiments it may make sense for a set of operational actions to be performed together. As such, multiple primitives may advantageously be combined into a selectable workflow. If it is determined 410 that there are primitives to be combined into a workflow, a workflow can be generated 412 using the primitive and other related primitives specified by the user, identified by the system, or otherwise selected. The generated primitives and/or workflows then can be stored 414 to a repository and exposed 416 for access, such as by a user, customer, application, resource, or other such entity or component.

Figure 5:
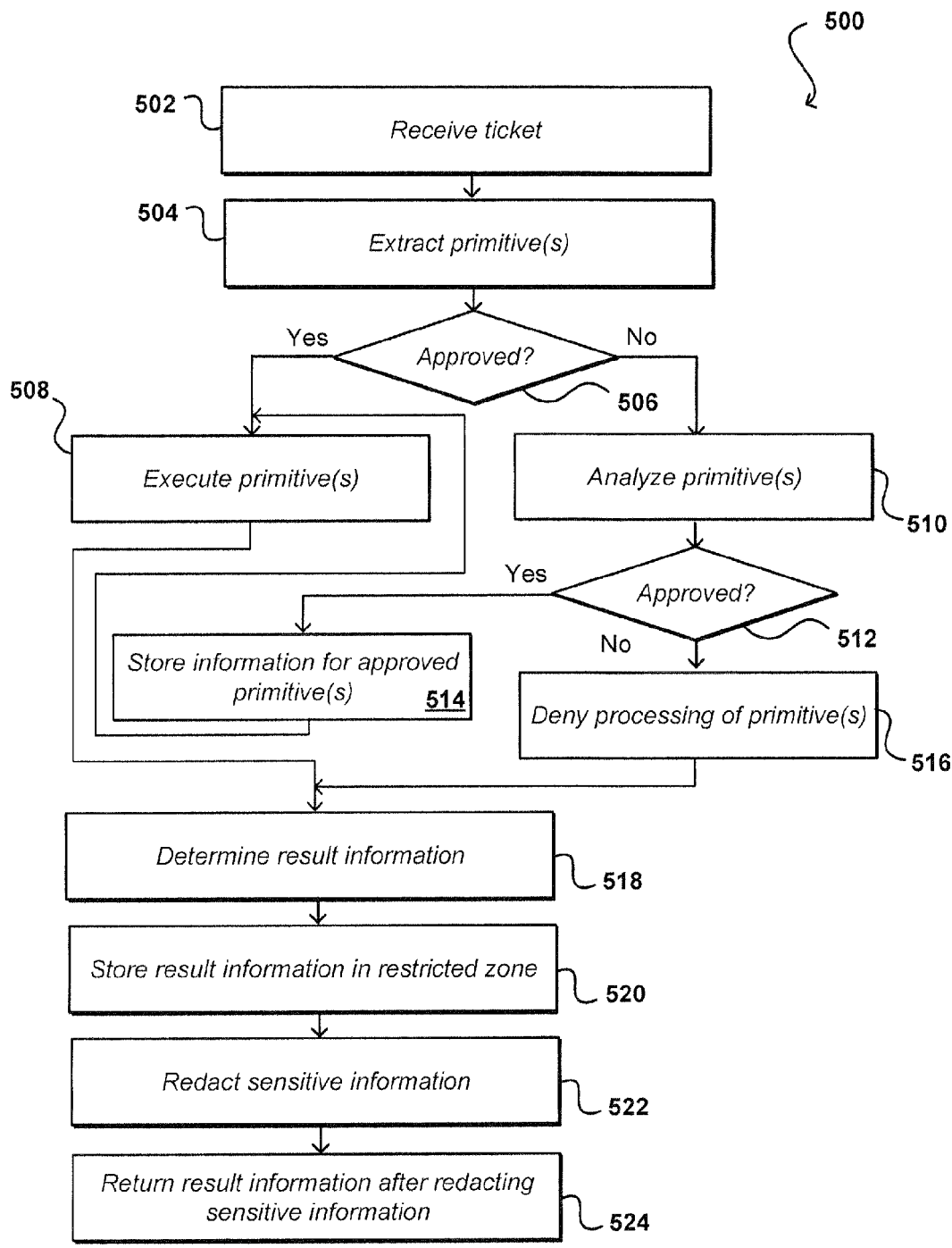
FIG. 5 illustrates an example process for receiving and approving tickets containing primitives to be executed in a restricted zone that can be used in accordance with various embodiments.

FIG. 5 illustrates another example process 500 for receiving, approving, and executing primitives in a restricted zone that can be utilized in accordance with various embodiments.

It should be understood that, for any process discussed herein, there can be additional, fewer, or alternative steps performed in similar or alternative orders, or in parallel, within the scope of the various embodiments unless otherwise stated. In this example, a ticket is received 502 for processing in the restricted zone. As discussed, the ticket can come from inside, or external to, resources of the restricted zone. In some embodiments, the ticket may be associated with primitives or workflows that include missing data, e.g., placeholders that can be resolved, for example, manually through user input or using some automated methods, as described above. Any primitives or workflows associated with the ticket can be extracted 504, and a determination can be made as to whether any or all of the primitives and/or workflows have been previously approved 506. As discussed, this can include performing a lookup against an action repository or similar storage mechanism in order to attempt to locate an approval for the primitives or workflows. If an approval is able to be located for a primitive, that primitive can be executed 508 in the restricted zone. If the primitive is part of a workflow or group of primitives that are to be executed together, the primitive might only be executed if all of the primitives are approved. If a primitive is not already approved, the primitive can be analyzed to determine whether or not the primitive should be approved 512. If the primitive is approved, information for the primitive and/or the approval can be stored 514 to a repository of other appropriate location in the restricted zone. The primitive can then be executed as discussed previously. If it is determined that the primitive should not be approved for execution in the restricted zone, the primitive is denied 516.

Once the primitive(s) has been approved or denied and any approved primitives have been executed, a set of result information can be determined 518 corresponding to the received ticket. At least a portion of this result information can be stored 520 in a repository of the restricted zone. For result data to be sent in response to receiving the ticket, any sensitive information can be redacted 522, as may be in accordance with one or more appropriate policies. This can include inserting placeholders where sensitive data would otherwise exist in the result information. The result information after the redacting can then be returned 524 to the address associated with the user, as well as potentially another repository of the resource provider system for storage as historical data or other such information.

Figure 6:
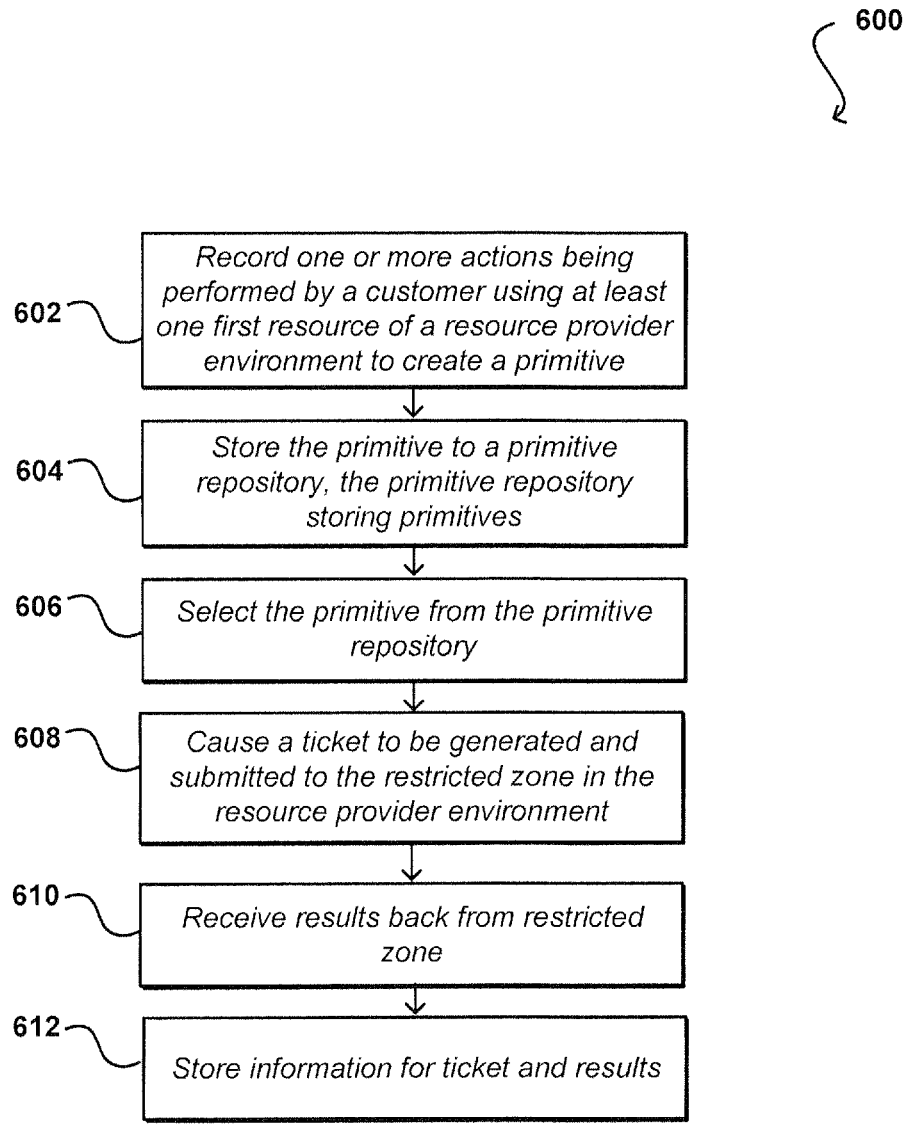
FIG. 6 illustrates an example process for recording primitives in a non-restricted zone that can be utilized in accordance with various embodiments enabling a user to select primitives and submit tickets to a restricted zone that can be used in accordance with various embodiments.

FIG. 6 illustrates another example process 600 for recording primitives in a non-restricted zone that can be utilized in accordance with various embodiments. It should be understood that, for any process discussed herein, there can be additional, fewer, or alternative steps performed in similar or alternative orders, or in parallel, within the scope of the various embodiments unless otherwise stated.

In this example, a recording 602 is made of one or more actions being performed by a customer or an agent of the customer on a resource of a resource provider environment in a non-restricted zone. The recording can be used to create a primitive that describes the one or more actions. The primitive is able to be executed on a different resource in a restricted zone in the resource provider environment to perform the one or more actions using the different resource. The primitive is stored 604 to a primitive repository. A selection 606 of the primitive is received. The selection can be made by an agent of the customer, for example. In some embodiments, once the primitive is selected, the customer or an agent of the customer can specify values for any parameters that are associated with the primitive. Depending on the implementation, the values for the parameters can be provided, for example, as an input through a graphical user interface or a text string that specifies the values.

A ticket is generated and submitted 608 to the restricted zone, which is provided for the customer but is directly accessible only to authorized entities. The ticket can contain information describing the selected primitive and is able to be executed in the restricted zone. Result information is received 610. The result information can include an approval of the primitive, a denial of the primitive, or information resulting from execution of the primitive in the restricted zone. A portion of the result information is stored 612 in a repository outside of the restricted zone. In some embodiments, an approval of the primitive indicates that the primitive is able to be executed in the restricted zone without another approval in the restricted zone.

Figure 7:
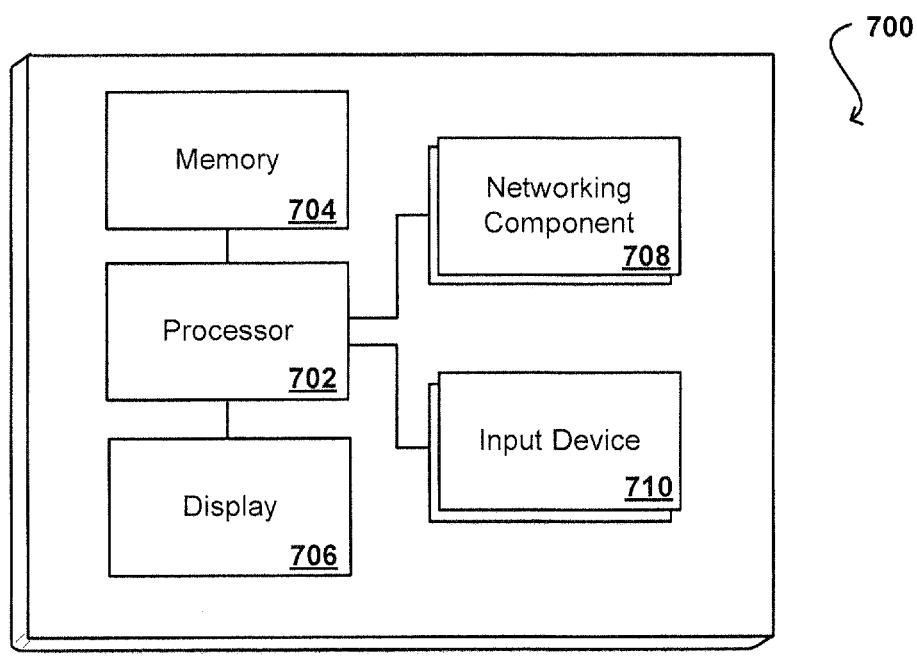
FIG. 7 illustrates a set of components of an example computing device that can be used to perform aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
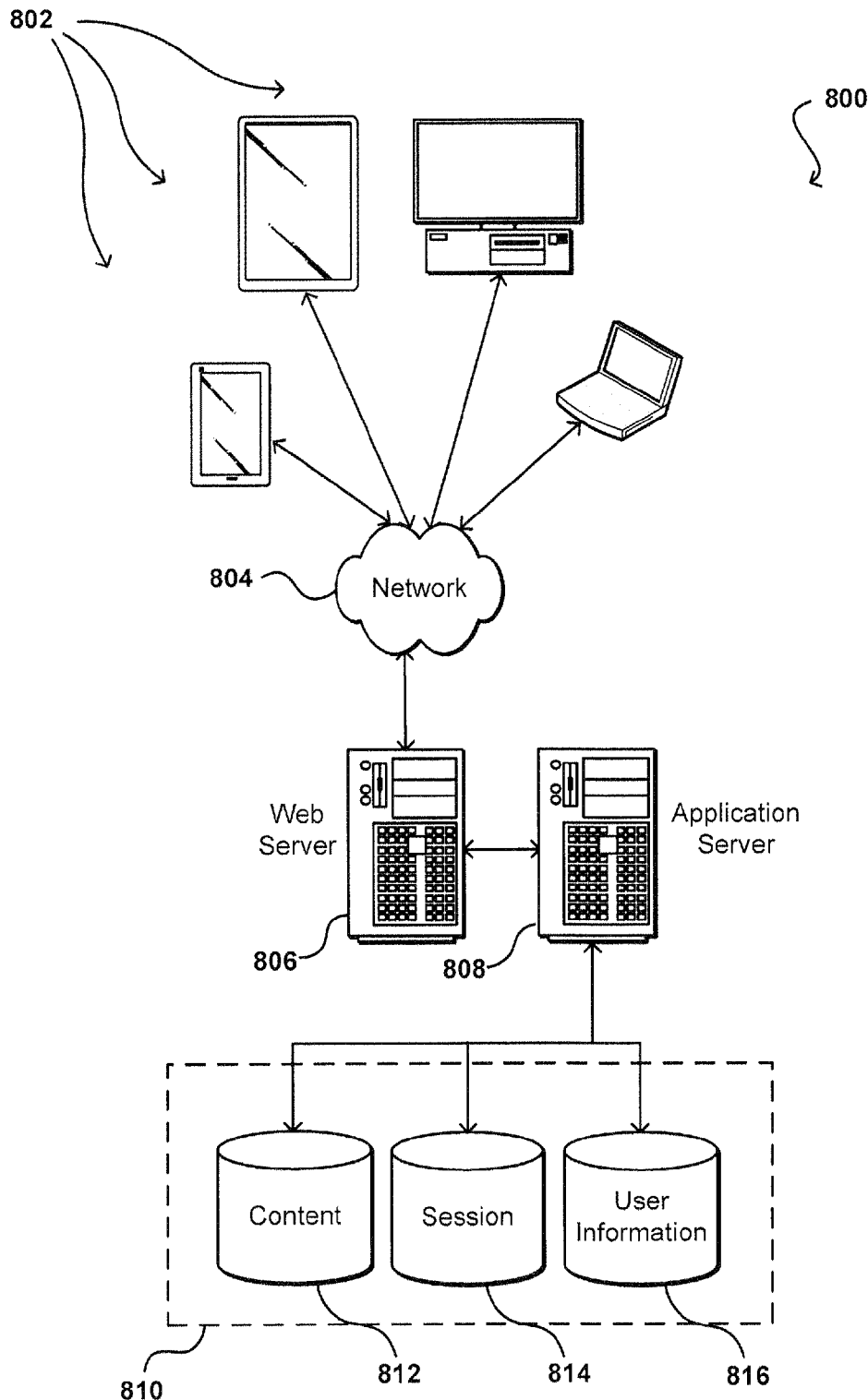
FIG. 8 illustrates an example environment in which aspects of various embodiments can be performed.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CUT servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   record, through a graphical user interface, one or more actions being performed by an agent of a resource provider using at least one first resource of a resource provider environment to create a primitive that describes the one or more actions, the at least one first resource being associated with a non-restricted zone in the resource provider environment, wherein the primitive is able to be executed on at least one different resource;
   store the primitive to a primitive repository, the primitive repository storing a plurality of primitives;
   receive a selection of the primitive from the primitive repository;
   cause a ticket to be generated and submitted to a restricted zone in the resource provider environment, the restricted zone being provided for a customer of the resource provider and being directly accessible only to entities authorized by the customer, wherein the ticket includes information describing the selected primitive that is able to be executed in the restricted zone;
   receive result information regarding at least one of an approval of primitive, a denial of the primitive, or information resulting from execution of the primitive in the restricted zone; and
   store at least a portion of the result information in a repository.

2. The system of claim 1, wherein the instructions when executed further cause the system to:
   receive data describing at least one change in the at least one different resource resulting from the execution of the primitive in the restricted zone; and
   updating the at least one resource in the non-restricted zone to mirror the at least one change in the at least one different resource in the restricted zone.

3. The system of claim 1, wherein the instructions when executed further cause the system to:
   determine at least one policy for the one or more actions and the restricted zone; and
   generate the primitive according to the at least one policy.

4. The system of claim 1, wherein the instructions when executed further cause the system to:
   determine at least one piece of data prevented from being extracted from the non-restricted zone, the at least one piece of data needed for inclusion in the primitive for proper execution in the restricted zone; and
   insert, into the primitive, a placeholder for each of the at least one piece of data, each piece of data capable of being inserted in place of a respective placeholder when the primitive is inside the restricted zone.

5. A computer-implemented method, the method comprising:
   recording one or more actions being performed by an agent of a resource provider on at least one resource of a resource provider environment, the at least one resource being associated with a non-restricted zone in the resource provider environment;
   creating a primitive that describes the one or more actions and specifies at least one parameter corresponding to at least one of the one or more actions, wherein the primitive is able to be executed on at least one resource in a restricted zone in the resource provider environment to perform the one or more actions, wherein the restricted zone includes resources associated with a customer and the resources are managed by at least one authorized entity that satisfies at least one criteria specified by the customer; and
   submitting the primitive to the restricted zone in the resource provider environment, wherein the primitive is executed by the at least one authorized entity on the at least one different resource in the restricted zone.

6. The computer-implemented method of claim 5, wherein recording the one or more actions being performed by the agent further comprises:

recording the one or more actions being performed by the agent through at least one of: a graphical user interface, a command-line interface, or an Application Programming Interface (API) that is exposed to the agent.

7. The computer-implemented method of claim 5, wherein recording the one or more actions being performed by the agent further comprises:
receiving, from the agent, instructions for including in the primitive a reference to a name of at least one resource in the restricted zone on which the primitive is to be executed and a reference to at least one credential to be used for executing the primitive.

8. The computer-implemented method of claim 5, wherein recording the one or more actions being performed by the agent further comprises:
receiving, from the agent, instructions for including in the primitive at least one test action that includes one or more logical tests, pre-conditions, or post-conditions.

9. The computer-implemented method of claim 5, further comprising:
receiving result information resulting from the execution of the primitive by the at least one authorized entity on the at least one different resource in the restricted zone.

10. The computer-implemented method of claim 9, wherein the result information includes at least one of: an approval of the primitive, a denial of the primitive, or information describing a result of the execution of the primitive.

11. The computer-implemented method of claim 9, further comprising:
determining that the result information includes an approval of the primitive;
storing at least a portion of the result information in a repository outside of the restricted zone, wherein approval of the primitive indicates that the primitive is able to be executed in the restricted zone without another approval from the at least one authorized entity.

12. The computer-implemented method of claim 5, wherein recording one or more actions being performed by the agent further comprises:
providing a user interface that includes a first region and a second region, wherein the first region is configured to record actions being performed by the agent, and wherein the second region is configured to present data describing the one or more actions being performed by the agent, wherein the agent is able to interact with the second region to edit data describing the one or more actions in a human-readable format.

13. The computer-implemented method of claim 5, further comprising:
receiving data describing at least one change in the at least one different resource in the restricted zone, the at least one change resulting from the execution of the primitive on the at least one different resource in the restricted zone; and
updating the at least one resource in the non-restricted zone to mirror the at least one change in the at least one different resource in the restricted zone.

14. The computer-implemented method of claim 5, further comprising:
insert, into the primitive, a respective placeholder that references at least one piece of data that resides inside the restricted zone, the at least one piece of data being inaccessible from the non-restricted zone, wherein the respective placeholder is able to be resolved to the at least one piece of data once the primitive is inside the restricted zone.

15. The computer-implemented method of claim 5, further comprising:
determine at least one piece of data prevented from being extracted from the non-restricted zone, the at least one piece of data needed for inclusion in the primitive for proper execution in the restricted zone; and
insert, into the primitive, a placeholder for each of the at least one piece of data, each piece of data capable of being inserted in place of a respective placeholder when the primitive is inside the restricted zone.

16. A non-transitory computer readable storage medium storing instructions for enabling self-service administration of a database, the instructions when executed by a processor causing the processor to:
record one or more actions being performed by an agent of a resource provider on at least one resource of a resource provider environment, the at least one resource being associated with a non-restricted zone in the resource provider environment;
create a primitive that describes the one or more actions and specifies at least one parameter corresponding to at least one of the one or more actions, wherein the primitive is able to be executed on at least one different resource in a restricted zone in the resource provider environment to perform the one or more actions, wherein the restricted zone includes resources associated with a customer that are directly accessible only to at least one authorized entity; and
submit the primitive to the restricted zone in the resource provider environment, wherein the primitive is executed by the at least one authorized entity on the at least one different resource in the restricted zone.

17. The non-transitory computer readable storage medium of claim 16, wherein recording the one or more actions being performed by the agent further comprises:
recording the one or more actions being performed by the agent through at least one of: a graphical user interface, a command-line interface, or an Application Programming Interface (API) that is exposed to the agent.

18. The non-transitory computer readable storage medium of claim 16, further comprising:
insert, into the primitive, a respective placeholder that references at least one piece of data that resides inside the restricted zone, the at least one piece of data being inaccessible from the non-restricted zone, wherein the respective placeholder is able to be resolved to the at least one piece of data once the primitive is inside the restricted zone.

19. The non-transitory computer readable storage medium of claim 18, further comprising:
determine at least one piece of data prevented from being extracted from the non-restricted zone, the at least one piece of data needed for inclusion in the primitive for proper execution in the restricted zone; and
insert, into the primitive, a placeholder for each of the at least one piece of data, each piece of data capable of being inserted in place of a respective placeholder when the primitive is inside the restricted zone.

20. The non-transitory computer readable storage medium of claim 16, further comprising:
receiving data describing at least one change in the at least one different resource in the restricted zone, the at least one change resulting from the execution of the primitive on the at least one different resource in the restricted zone; and updating the at least one resource in the non-restricted zone to mirror the at least one change in the at least one different resource in the restricted zone.

* * * * *